Patented July 24, 1934

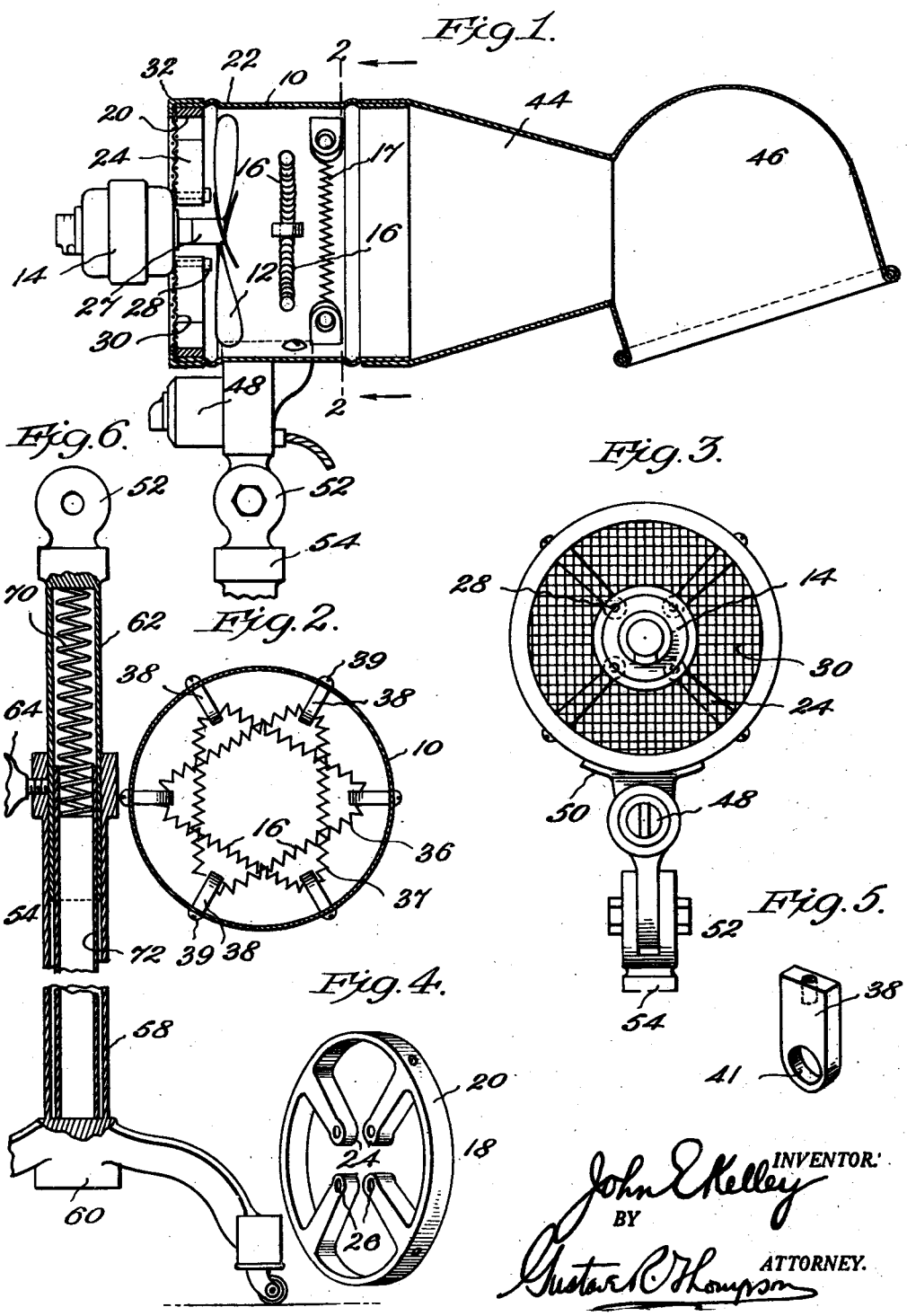

1,967,713

UNITED STATES PATENT OFFICE 1,967,713

DRIER OR BLOWER

John E. Kelley, Larchmont, N. Y.

Application January 19, 1931, Serial No. 509,682

2 Claims. (Cl. 34—26)

This invention relates to driers of the type used for drying hair, skin and the like, and comprising a casing, a fan, an electric motor for driving the fan, and usually an electric heater, and provides improvements therein.

The invention provides a device of the character described, of very simple construction, low cost and good performance, and capable of being manufactured and sold at a profit in a depressed market.

An embodiment of the invention is illustrated in the accompanying drawing, wherein, Figure 1 is a vertical longitudinal section thereof;

Figure 2 is a transverse section in the line 2—2, Fig. 1;

Fig. 3 is a rear elevation;

Figs. 4 and 5 are perspective detail views of parts.

Fig. 6 is a detail view partly in section of the stand.

A pedestal type of hair drier is illustrated, but the inventive ideas may be embodied in portable hand types, skin drying types (such as used in lavoratories) and in various other forms.

Referring to said drawing, numeral 10 designates a casing having a tubular structure, 12 a fan, 14 an electric motor for driving the fan, and 16 an electric heater within the casing for heating, when so desired, the air propelled through the casing by the fan.

Numeral 18 designates a spider which is provided with a peripheral portion 20, adapted to serve as a frame to reinforce the casing, the body 22 of the casing being preferably formed as a sheet metal cylindrical body, and the peripheral portion 20 being correspondingly shaped, and adapted to fit interiorly within the body 22 at one end, as shown. The spider 18 is provided with a plurality of radially inward projections or arms 24 adapted to support the motor 14. The arms 24 preferably extend inwardly short of the center so as to allow an axial space for the shaft 27 of the motor. The arms are conveniently provided with holes 26 through which screws or bolts 28 may be passed for binding the motor 14 thereto. The motor 14 itself is preferably arranged as shown outside of the casing, the shaft 27 extending into the casing and having the fan 12 fixed thereto inside the casing.

A screen 30 is placed behind the fan as a protection. The screen is preferably fastened in position by being clamped against the spider 18 by means of a flanged ring 32, which preferably extends over the exterior of the casing 10 at its rear end, and provides a finished appearance for the end of the casing. The arms 24 of the spider preferably bear against the screen and form a reinforcement for its middle portion.

The electric heater 16 is preferably located inside the casing 10 ahead of the fan 16 so as to heat (when desired) the air propelled over it by the fan. The heater is preferably in the form of coiled resistance wire, looped around the axis of the casing, preferably two or more loops 36, 37 being provided, two being illustrated. The loops may be angular loops, and a loop in one plane is preferably arranged so that the corners in one loop are opposite the straight portions of the loop in another plane, whereby only a minimum portion of one loop is behind another in the direction of flow of the air, thereby providing favorable conditions for communicating heat from the coil to the air blown over the same. For supporting the coil 16 as herein described, a plurality of insulating blocks 38 which are attached directly to the body of the casing 10 on its inner side, are provided. Screws 39 passing through the casing 10 from the outside and engaging threads in blocks 38 serve for fastening the blocks 38 to the casing. Suitable means 41 may be provided on the blocks for holding the heating coil 16 thereon, such as the holes shown, the coil 16 being threaded through the holes 41 in the circumferentially successive blocks.

In the embodiment illustrated, the casing 10 is provided with a conical delivery tube 44 which may be an extension of the casing 10, and a hood 46 adapted to receive the head of the person whose hair is to be dried, may be provided at the end of the tube 44. Any other suitable form of delivery tube may be employed, however.

A switch 48 is provided for controlling the flow of current to the device.

In the form of embodiment shown, the casing 10 is conveniently mounted upon a saddle 50 forming part of a pivotal connection 52 to a pedestal or stand 54.

The stand 54 is preferably made adjustable as to height, and may comprise a tube 58 mounted in a base 60 and a tube 62 telescoping therein to extend or contract the combined height of the telescoping tubes 58 and 62. The saddle 50 is attached to tube 62 through the pivotal connection 52. Means 64, such as a setscrew threaded into the tube 58 and bearing at its end against the tube 62 may be provided for holding the telescoping tube in adjusted positions.

For lightening the effort exerted for adjusting the vertical height of the telescoping tubes, suitable means may be provided, as a compression spring 70. This compression spring 70 may be mounted upon a tube 72 within the other tubes 58 and 62, and bear respectively against the base 60 and the underside of the connection 54, thereby forming a cushioned and resilient support between the telescoping tubes.

The invention may receive other embodiments than that herein specifically illustrated and described.

What is claimed is:

1. A drier comprising a casing having a tubular structure, a spider-like frame located at the rear edge of said casing, said frame being formed as a simple ring of a diameter to fit entirely within and support the inside of said casing and with inwardly projecting radial arms, free at the inner ends, extending short of the axis of said ring, a fan motor at the outer side of said spider, and having a fan-shaft extending inwardly into the casing through the space at the inner ends of said arms, means for fastening said fan-motor to said arms against the outside faces thereof, and a fan on said fan-shaft in said casing inwardly beyond said spider.

2. A drier according to claim 1 further including a flat screen at the outside of said spider, said arms supporting said screen against pressure tending to force it inwardly, and a flanged ring for clamping the marginal portion of said screen against the ring-portion of said spider.

JOHN E. KELLEY.